(12) United States Patent
Okada

(10) Patent No.: US 12,437,440 B2
(45) Date of Patent: Oct. 7, 2025

(54) POSITIONING DEVICE

(71) Applicant: Panasonic Intellectual Property Management Co., Ltd., Osaka (JP)

(72) Inventor: Tsukasa Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 577 days.

(21) Appl. No.: 17/874,561

(22) Filed: Jul. 27, 2022

(65) Prior Publication Data

US 2022/0358674 A1 Nov. 10, 2022

Related U.S. Application Data

(63) Continuation of application No. PCT/JP2020/034511, filed on Sep. 11, 2020.

(30) Foreign Application Priority Data

Feb. 7, 2020 (JP) .................................. 2020-019928

(51) Int. Cl.
*G06T 7/73* (2017.01)
*G01C 19/00* (2013.01)
(Continued)

(52) U.S. Cl.
CPC ............... *G06T 7/73* (2017.01); *G01C 19/005* (2022.01); *G06T 7/246* (2017.01); *G06T 7/80* (2017.01)

(58) Field of Classification Search
CPC .. G06T 7/73; G06T 7/246; G06T 7/80; G06T 2207/30244; G06T 2207/10021;
(Continued)

(56) References Cited

U.S. PATENT DOCUMENTS 10,133,278 B2 * 11/2018 Shin ...................... B25J 9/1697
2007/0067137 A1 3/2007 Ohkubo et al.
(Continued)

FOREIGN PATENT DOCUMENTS

JP 2011-141221 7/2011
JP 2012-215547 11/2012
(Continued)

OTHER PUBLICATIONS

International Search Report issued Nov. 10, 2020 in International (PCT) Application No. PCT/JP2020/034511.
(Continued)

*Primary Examiner* — Andrew M Moyer
*Assistant Examiner* — Ahmed A Nasher
(74) *Attorney, Agent, or Firm* — Wenderoth, Lind & Ponack, L.L.P.

(57) ABSTRACT

A positioning device includes an camera, a detector, and a circuit. The camera is mounted on a moving body, and captures an image of surroundings of the moving body to acquire a captured image. The detector is mounted on the moving body, detects motion of the moving body, and outputs a detection signal indicating a detection result. The circuit processes the detection signal using a correction value for correcting a bias error included in the detection signal without depending on the motion of the moving body. The circuit computes the position of the moving body based on the captured image acquired by the camera and the detection signal processed. If the circuit determines that the moving body is stationary, the circuit updates the correction value of the bias error based on the detection signal output by the detector.

8 Claims, 15 Drawing Sheets

(51) Int. Cl.
*G06T 7/246* (2017.01)
*G06T 7/80* (2017.01)

(58) Field of Classification Search
CPC . G06T 7/74; G06T 7/174; G06T 2207/10016; G01C 19/005; G01C 21/005; G01C 21/28; G01C 19/00; G01C 21/16; G01C 21/10; G01B 11/002; G01B 11/026; G01P 13/00; G06V 10/44; G06V 10/462; G06V 20/653
See application file for complete search history.

(56) References Cited

U.S. PATENT DOCUMENTS

| | | | |
|---|---|---|---|
| 2014/0270380 A1 | 9/2014 | Morin | |
| 2016/0341543 A1 | 11/2016 | Jancic et al. | |
| 2017/0151674 A1 | 6/2017 | Shin et al. | |
| 2017/0345161 A1 | 11/2017 | Takatani et al. | |
| 2019/0056426 A1* | 2/2019 | Chandel | G01C 25/005 |
| 2019/0318501 A1* | 10/2019 | Balan | A63F 13/212 |
| 2020/0050205 A1* | 2/2020 | McClelland | G01C 21/20 |
| 2021/0070407 A1 | 3/2021 | Ishii | |

FOREIGN PATENT DOCUMENTS

| | | | |
|---|---|---|---|
| JP | 2017-215193 | | 12/2017 |
| JP | 2018-96914 | | 6/2018 |
| JP | 2018096914 A | * | 6/2018 |
| WO | 2017/094521 | | 6/2017 |
| WO | 2019/186677 | | 10/2019 |
| WO | 2019/230620 | | 12/2019 |

OTHER PUBLICATIONS

English-language translation of International Preliminary Report on Patentability issued Jul. 28, 2022 in corresponding International (PCT) Patent Application No. PCT/JP2020/034511.

Office Action issued Apr. 16, 2024 in Japanese Patent Application No. 2021-575599, with English-language Translation.

* cited by examiner (a)

BIAS UPDATE (b)

POSITIONING DEVICE

CROSS-REFERENCE TO RELATED APPLICATIONS

The present application is a continuation of PCT/JP2020/034511 filed on Sep. 11, 2020, which claims priority to Japanese Patent Application No. 2020-019928, filed on Feb. 7, 2020, the entire contents of which are incorporated herein by reference.

TECHNICAL FIELD

The present disclosure relates to a positioning device that measures a position of a moving body.

BACKGROUND ART

JP 2012-215547 A discloses a calibration method capable of computing a zero point offset of a gyro and calibrating the zero point offset. The calibration method of JP 2012-215547 A uses dead reckoning using outputs of an acceleration sensor and an angular velocity sensor. In order to execute the calibration method described in Patent Document 1, it is necessary to install anchors being transmitters that transmit anchor IDs at the first point and the second point.

SUMMARY

The present disclosure provides a positioning device that can more easily remove a bias error included in a detection signal of a mounted detector than a conventional technique.

A positioning device according to the present disclosure is a positioning device that measures a position of a moving body. The positioning device includes an camera, a detector, and a circuit. The camera is mounted on a moving body, and captures an image of an environment around the moving body to acquire a captured image. The detector is mounted on the moving body, detects motion of the moving body, and outputs a detection signal indicating a detection result. The circuit processes the detection signal using a correction value for correcting a bias error included in the detection signal without depending on the motion of the moving body. The circuit computes the position of the moving body based on the captured image acquired by the camera and the detection signal processed. The circuit determines whether or not the moving body is stationary. If the circuit determines that the moving body is stationary, the circuit updates the correction value of the bias error based on the detection signal output by the detector.

According to the positioning device of the present disclosure, the bias error included in the detection signal of the mounted detector can be removed more easily than the conventional technique.

Figure 1:
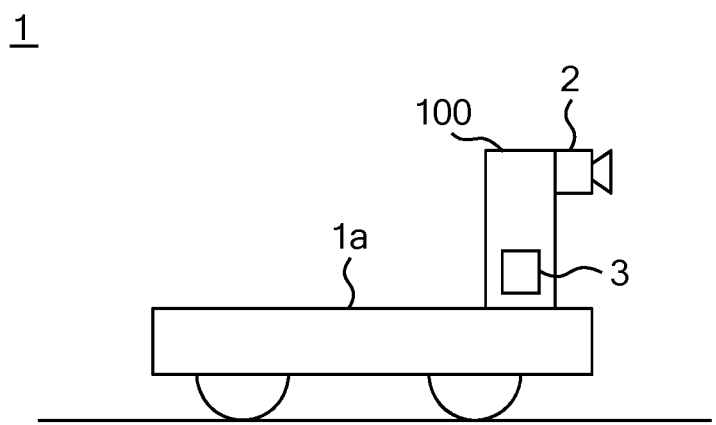
FIG. 1 is a schematic diagram illustrating a configuration of a moving body mounting a positioning device according to a first embodiment.

DETAILED DESCRIPTION (Background Leading to Present Disclosure)

For example, there is known a positioning device mounted on a moving body such as a manned cargo vehicle such as a forklift, an automated guided vehicle (AGV), and an autonomously movable load carrier robot, and measures a position of the moving body using a captured image captured by a camera. As a technique constituting such a positioning device, for example, a Visual-SLAM. (Simultaneous Localization and Mapping) technique for measuring a self-position and generating map information based on sequentially captured images is known.

The inventor of the present application has studied a technique for improving measurement accuracy of the position of a moving body by the Visual-SLAM technique, further using an inertial measurement unit (hereinafter referred to as "IMU"). Here, the detection value output by the IMU includes a bias error output without depending on the motion of the moving body. For example, a gyro sensor that detects an angular velocity, which is an example of the IMU, outputs a zero point without an input value, that is, a non-zero detection value even when the gyro sensor does not rotate. The non-zero detection value is an example of the bias error. The bias error is also referred to as, for example, a zero point bias error, a null bias error, a zero point offset, or a null offset.

JP 2012-215547 A discloses a calibration method for calibrating a zero point offset of a gyro. This calibration method includes: processing of specifying a difference between a position or an angle obtained at a second point by dead reckoning using outputs of the acceleration sensor and the angular velocity sensor, and a specific amount, when a moving body moves from a first point to the second point where an error of the position or the angle is the specific amount; and processing of computing a zero point offset being a sensor value output by the angular velocity sensor when the moving body is in a stationary state from the difference obtained as a specific result. However, anchors being transmitters that transmit anchor IDs need to be installed at the first point and the second point, and the moving body terminal needs to perform wireless communication with the anchors. Therefore, calibration cannot be executed in a case where no anchor is installed. When the anchor is installed, the cost for the installation is high, and the moving body needs to be provided with a device for wireless communication with the anchor, so that 1.0 the configuration becomes complicated.

The inventor of the present application has intensively studied the influence of the bias error in the position measurement of the moving body including such problems of the conventional technique, and has devised the positioning device according to the present disclosure. A positioning device according to the present disclosure performs a stationary determination using a position of a moving body measured by the own device, acquires a bias error at the time of being stationary, and executes bias update processing. Thus, the bias error included in the detection signal of the IMU can be accurately removed, and the position of the moving body can be accurately measured using the detection result of the IMU. Furthermore, according to the present disclosure, unlike the conventional technique, it is possible to obtain a positioning device in which it is not necessary to install an external apparatus such as an anchor in a movement path of a moving body in order to execute bias update processing.

Hereinafter, embodiments will be described in detail with reference to the drawings as appropriate. However, a detailed description more than necessary may be omitted. For example, a detailed description of already well-known matters and a redundant description for substantially the same configuration may be omitted. This is to avoid the unnecessary redundancy of the following description and to facilitate understanding by those skilled in the art.

It should be noted that the applicant provides the accompanying drawings and the following description for a person skilled in the art to fully understand the present disclosure. Thus, the drawings and the description are not intended to limit the subject matter defined in the claims.

First Embodiment

1. Configuration

FIG. 1 is a schematic diagram illustrating a configuration of a moving body 1. A positioning device 100 according to the first embodiment of the present disclosure is mounted on a moving body 1 such as a manned cargo vehicle such as a forklift, an AGV, and an autonomously movable load carrier robot, and measures a position of the moving body 1.

The moving body 1 includes, for example, a cargo bed 1a for mounting a load. The positioning device 100 according to the present embodiment is mounted on the moving body 1. The positioning device 100 includes a camera 2 that images surroundings of the moving body 1, and an IMU 3.

For example, a Visual-SLAM technique for measuring the self-position and generating map information based on sequentially captured images can be applied to the positioning device 100. The positioning device 100 accurately measures the position of the moving body 1 using not only the captured image captured by the camera 2 but also the angular velocity signal being the detection result of the IMU 3.

Figure 2:
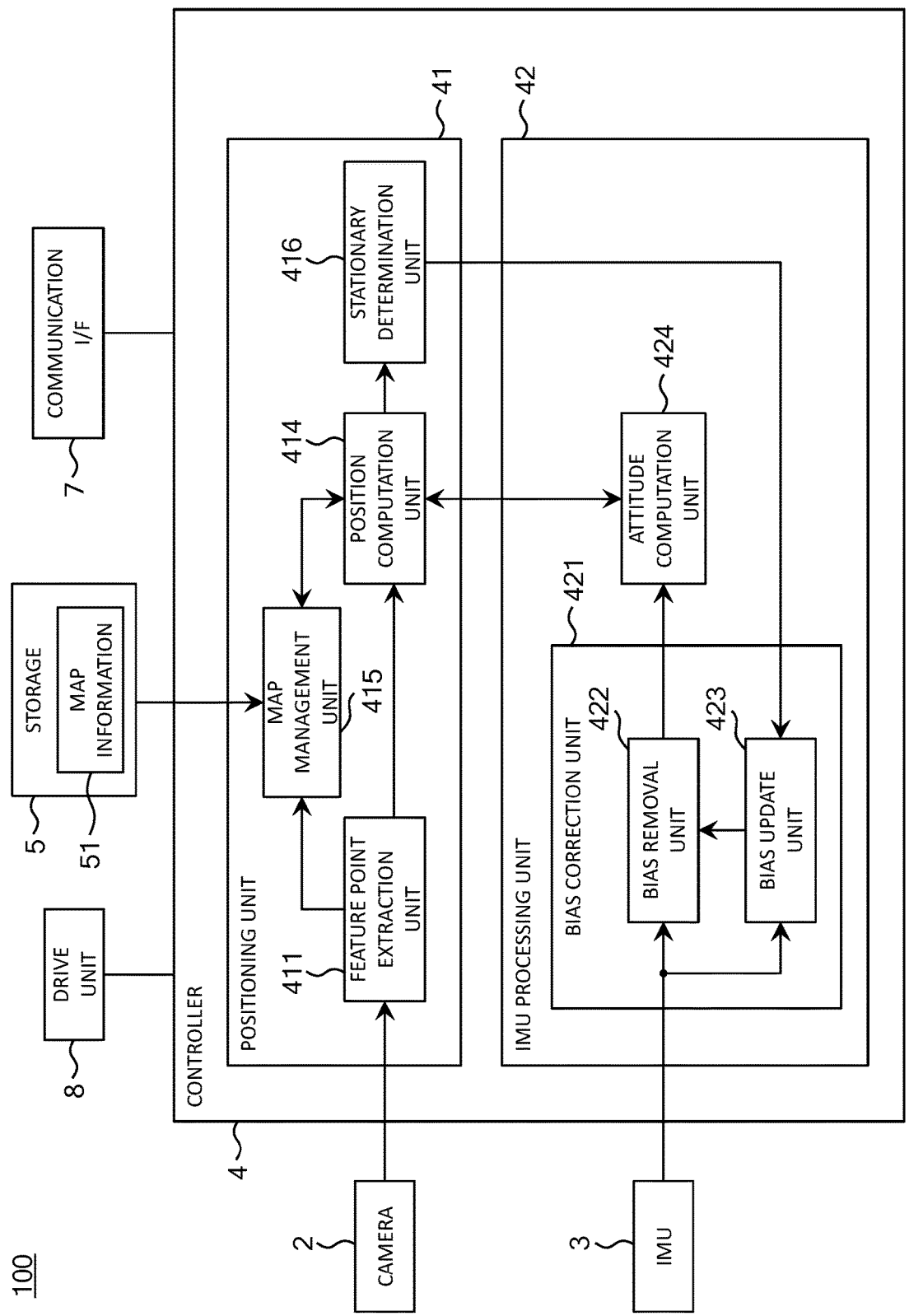
FIG. 2 is a block diagram showing a configuration of the positioning device according to the first embodiment.

FIG. 2 is a block diagram showing a configuration of the positioning device 100. The positioning device 100 includes a camera 2, an IMU 3, a controller 4, a storage 5, a communication interface (I/F) 7, and a drive unit 8.

The camera 2 is an example of an imaging unit according to the present disclosure. The camera 2 is installed on the moving body 1, images the surroundings of the moving body 1, and generates color image data and distance image data. The camera 2 may include a depth sensor such as an RGB-D camera or a stereo camera. In addition, the camera 2 may include an RGB camera that captures a color image and a time of flight (ToF) sensor that captures a distance image.

The IMU 3 is an example of a detector according to the present disclosure. The IMU 3 is installed on the moving body 1, detects, for example, an angular velocity of the moving body 1 as motion information indicating motion of the moving body 1, and outputs a detection signal indicating a detection result.

The controller 4 includes a general-purpose processor such as a CPU or an MPU that cooperates with software to implement predetermined functions. The controller 4 loads and executes a program stored in the storage t to implement various functions of a positioning unit. 41, a IMU processing unit 42, and the like, to control the overall operation of the positioning device 100. The positioning unit. 41 includes a feature point extraction unit 411, a position computation unit 414, a map management unit 415, and a stationary determination unit 416. The IMU processing unit 42 includes a bias correction unit 421 and an attitude computation unit 424. The bias correction unit 421 includes a bias removal unit 422 and a bias update unit 423.

For example, the controller 4 executes a program for implementing the positioning method according to the present embodiment or a program that implements the SLAM algorithm. The controller 4 is not limited to a controller that implements predetermined functions through cooperation between hardware and software, and may be configured with a hardware circuit such as an FPGA, an ASIC, or a DSP designed as a dedicated circuit for implementing the predetermined functions.

The storage 5 is a recording medium that stores various information including programs and data necessary for implementing the functions of the positioning device 100. The storage 5 stores, for example, map information 51 and image data. The storage 5 is implemented by any one or combination of storage devices, such as a semiconductor memory device such as a flash memory or an SSD, a magnetic storage device such as a hard disk, and a storage device of a different type. The storage 5 may include a volatile memory such as an SRAM or a DRAM capable of high-speed operation for temporarily storing various information. The volatile memory operates as, for example, a frame memory that temporarily stores a work area of the controller 4 and image data for each frame.

The communication I/F 7 is an interface circuit for enabling communication connection between the positioning device 100 and an external apparatus such as an external server via a network. The communication I/F 7 performs communication in accordance with a standard such as IEEE 802.3 or IEEE 802.11.

The drive unit 8 is a mechanism that moves the moving body 1 in accordance with instructions from the controller 4. For example, the drive unit 8 includes a drive circuit of an engine, a steering circuit, and a brake circuit, connected to a tire of the moving body 1.

2. Operation

The operation of the positioning device 100 configured as described above will be described below.

2-1. Position Measurement Processing

Referring to FIG. 2, an example of positioning processing will be described as a basic operation of the positioning device 100. The positioning processing is executed by the controller 4 operating as the positioning unit 41.

First, the controller 4 acquires data on a plurality of captured images captured at a constant frame rate from the camera 2. Here, the captured image is image data on the environment around the moving body 1 captured by the camera 2.

Next, the controller 4 operating as the feature point extraction unit 411 analyzes the captured image and extracts a feature point. The controller 4 extracts, as feature points, a pixel or a pixel group whose luminance value or color can be distinguished from surrounding pixels or pixel groups. In order to detect the feature point from the captured image, for example, a known FAST (Features from Accelerated Segment Test) technology may be used.

It should be noted that the controller 4 performs not only computation processing of the position of the moving body 1 but also creation processing of the map information 51. The map information 51 includes information on a two-dimensional position, a three-dimensional position, or both, of the feature point. The controller 4 operating as the map management unit 415 creates map information 51 by converting the coordinates on the captured image of the feature point into world coordinates and registering the map point corresponding to the feature point on the captured image in the world coordinate space. In the map information 51, a camera frame indicating a captured image, and a position and an orientation of the camera 2 when the captured image is captured (hereinafter, referred to as "camera pose") are recorded together with a map point corresponding to a feature point on the captured image. The created map information 51 is stored in the storage 5. The controller 4 can generate the map information 51 by, for example, acquiring captured images at predetermined time intervals to register feature points, during the motion of the moving body 1.

The controller 4 operating as the position computation unit 414 computes the position of the camera 2 and eventually the position of the moving body 1 using the information on the feature points on the captured image extracted by the feature point extraction unit 411 and the map information 51 stored in the storage 5. For example, the controller 4 operating as the position computation unit 414 performs feature point matching processing of associating a feature point in the captured image with a map point in the map information 51, and computes a camera pose of the camera 2 that has captured the captured image. Alternatively, as the feature point matching processing, the controller 4 may associate the feature point in the previous frame with the feature point in the current frame acquired next to the previous frame using, for example, a known Kanade-Lucas-Tomasi (KLT) tracker technology.

The feature point matching processing is, for example, processing of determining whether or not a feature point in a current frame corresponds to a map point in the map information 51 or a feature point in a previous frame based on a feature amount of the feature point. Through the feature point matching processing, the controller 4 operating as the position computation unit 414 can track the corresponding feature point between a plurality of captured images sequentially acquired by the camera 2. The feature amount of the feature point is, for example, a speeded-up robust features (SURF) feature amount obtained by the SURF technology, a scale-invariant feature transform (SIFT) feature amount obtained by the SIFT technology, or an oriented FAST and rotated BRIEF (ORB) feature amount obtained by the ORB technology. The feature amount of the feature point is represented by, for example, a vector having one or more dimensions. For example, the SURF feature amount is represented by a 64 dimensional vector, and the SIFT feature amount is represented by a 128 dimensional vector. The similarity of the feature amounts is computed as, for example, a distance such as a Euclidean distance between feature amounts.

Next, the controller 4 operating as the position computation unit 414 computes a camera pose corresponding to the current frame. The camera pose corresponding to the current frame is computed, for example, based on a geometric positional relationship between a feature point in the previous frame and a feature point in the current frame. In order to improve the computation accuracy and/or computation efficiency of the camera pose corresponding to the current frame, for example, the attitude of the moving body 1 computed by the attitude computation unit 424 of the IMU processing unit 42 may be used. The attitude computation unit 424 can acquire the camera pose corresponding to the previous frame from the position computation unit 414 and compute the estimated attitude of the moving body 1 corresponding to the current frame based on the camera pose and the angular velocity detected by the IMU 3. The position computation unit 414 acquires the estimated attitude of the moving body 1 corresponding to the current frame computed by the attitude computation unit 424 and converts the estimated attitude into a camera pose corresponding to the current frame.

As described above, using the angular velocity detected by the IMU 3 for estimation of the attitude of the moving body 1 allows the positioning device 100 to efficiently perform feature point matching even when the moving body 1 accelerates or rotates.

In the positioning processing of the present embodiment, in the IMU processing unit 42, the attitude computation unit 424 operates based on the bias corrected detection signal obtained by processing the detection signal from the IMU 3 by the bias correction unit 421. In the bias correction unit 421, the bias removal unit 422 performs processing of removing the bias error by subtracting the correction value of the bias error from the detection signal output by the IMU 3. The correction value of the bias error is set in advance as a signal value for offsetting the error included in the detection signal. The correction value of the bias error is also referred to as a zero point offset and a null offset. The bias update unit 423 performs bias update by setting a correction value of the bias error to the bias removal unit 422 in bias update processing described below.

The position data of the moving body 1 obtained by the above positioning processing is accumulated in, for example, an external server or an internal memory of the positioning device 100, and constitutes position history data indicating a history of the position of the moving body 1. Such position history data can be adopted, for example, for various data management and data analysis related to a track in which the moving body 1 moves in the environment (see FIG. 3). When the position history data is obtained by the positioning device 100 of the present embodiment so as to accurately measure the track of the moving body 1, the above-described data management and analysis in the external server can be made highly accurate, for example.

2-2. Bias Update Processing 2-2-1. Overview of Operation

The positioning device 100 of the present embodiment repeats the bias update processing during the implementation of the positioning processing as described above to update the correction value of the bias error in real time. An overview of bias update processing will be described below with reference to FIG. 3.

Figure 3:
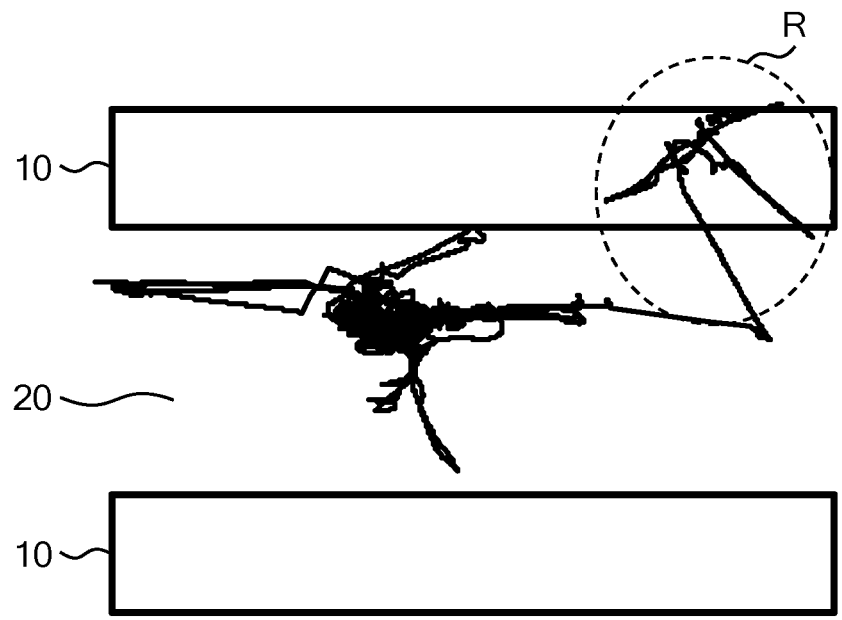
FIG. 3 is a schematic diagram illustrating position history data indicating a history of measurement results by the positioning device according to the first embodiment.
Figure 3:
Figure 3:
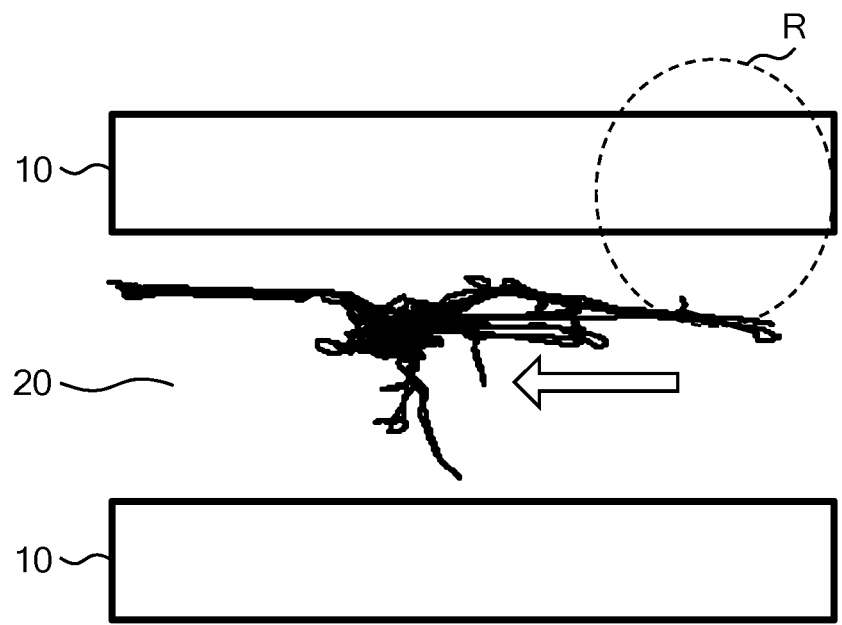

Movement history data obtained by a positioning device when the moving body mounting the positioning device moves only in a passage extending between two entry prohibited areas will be described with reference to FIGS. 3(a) and 3(b). FIG. 3(a) is a schematic diagram illustrating position history data by the positioning device operated without performing bias update for a long time. The position history data is stored in, for example, an external server or the like. FIG. 3 shows two-dimensional map data in which two entry prohibited areas 10 and a passage 20 extending between the entry prohibited areas 10 are viewed from above. As shown in FIG. 3(a), when the positioning device is operated without performing the bias update for a long time, the position history data includes a track of erroneous measurement as if the moving body erroneously travels into the region R surrounded by the broken line and enters the entry prohibited area 10. When such erroneous measurement is mixed in the position history data, the accuracy of data management and analysis in the external server described above is deteriorated, for example.

According to the energetic research of the inventor of the present application, it has been found that the above-described erroneous measurement is caused by fluctuation of a bias error of the IMU 3 during position measurement over the track of the moving body 1, for example. The bias error immediately after the startup of the IMU 3 can be acquired as, fox example, an average value of sensor values in a stationary state acquired during several seconds from the startup. The bias correction can be performed by subtracting a bias error immediately after startup from a subsequent measurement value.

However, the bias error varies due to an external factor such as temperature. Therefore, only performing the bias correction immediately after the startup of the IMU 3 causes the bias error to fluctuate when the IMU 3 is continuously operated and the error included in the detection value of the IMU 3 to increase. When the error included in the detection value of the IMU 3 increases, and when the detection result of the IMU 3 is used for computing the camera pose in the positioning device 100, the camera pose is erroneously computed.

In response to such a problem, the inventor of the present application has conducted energetic studies, and has conceived bias update processing of not only acquiring a bias error immediately after startup but also updating a bias error to be removed from a detection signal at an appropriate timing even during subsequent operation continuation.

FIG. 3(b) is a schematic diagram showing a history of measurement results of the moving body 1 by the positioning device 100 when the bias update processing of the present embodiment is applied. As compared with FIG. 3(a), the position history data on FIG. 3(b) indicates a track in which the moving body 1 has moved in the correct direction along the passage 20 indicated by the arrow without erroneously traveling into the region R surrounded by the broken line as a result of the bias update processing. Hereinafter, details of the bias update processing according to the present embodiment will be described.

2-2-2. Details of Operation

Figure 4:
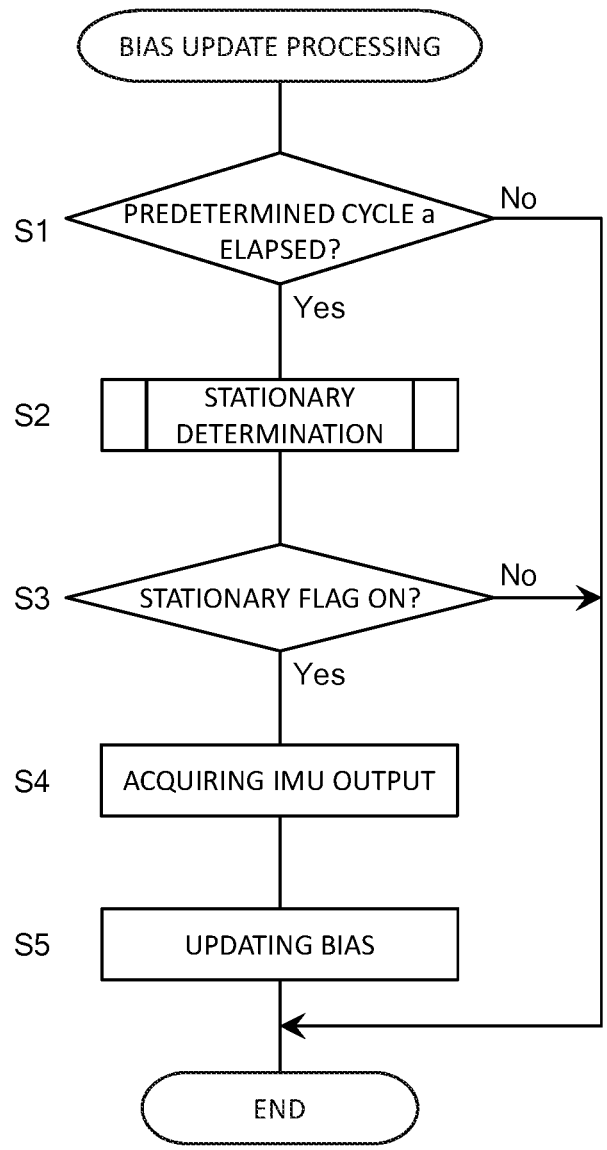
FIG. 4 is a flowchart showing an example of bias update processing executed by the positioning device according to the first embodiment.

FIG. 4 is a flowchart showing an example of bias update processing executed by the positioning device 100 according to the present embodiment. The bias update processing is repeatedly executed by the controller 4.

First, the controller 4 determines whether a predetermined cycle a has elapsed since the bias update processing was completed last (S1). If the predetermined cycle a has not elapsed (No in S1), the controller 4 ends the bias update processing in FIG. 4 without proceeding in and after step S2. If the predetermined cycle a has elapsed (Yes in S1), the controller 4 operating as the stationary determination unit 416 performs stationary determination processing of determining whether or not the moving body 1 is stationary (S2). For example, the predetermined cycle a is 1 (s).

The stationary determination processing S2 of the present embodiment is performed by detecting a period in which the moving body 1 has a sufficiently small speed, that is, a stationary period, using the measurement result of the positioning unit 41 based on the Visual-SLAM technology. When determining that the moving body 1 is stationary, the controller 4 turns on the stationary flag indicating the determination result, and when not determining that the moving body 1 is stationary, the controller 4 turns off the stationary flag. Details of the stationary determination processing S2 will be described below.

Next, the controller 4 operating as the bias update unit 423 determines whether or not the stationary flag is ON (S3). If the stationary flag is OFF, that is, if the stationary flag is not ON (No in S3), the controller 4 ends the bias update processing in FIG. 4 without particularly correcting the bias error.

On the other hand, if the stationary flag is ON (Yes in S3), the controller 4 operating as the bias update unit 423 acquires the detection signal output by the IMU 3 during the stationary period (S4), for example, and updates the bias error by setting the correction value of the bias error based on the signal value (S5). The correction value of the bias error is computed as, for example, an average value of the detection signal values of the IMU 3 acquired during several seconds at the time of stationary. Alternatively, in step S4, the controller 4 acquires the detection signals output from the IMU 3 between the time point going back by a predetermined time S from the stationary determination time when the stationary flag is turned on and the stationary determination time, and sets the average value of the detection signal values as the correction value of the bias error.

The bias error is updated by the bias update processing as described above. The bias removal unit 422 acquires the updated bias error from the bias update unit 423, and performs bias correction, for example, by subtracting the updated bias error from a subsequent measurement value.

As described above, the positioning device 100 can perform the stationary determination processing S2 using the measurement result of the position of the moving body 1 by the positioning unit 41 and execute the bias update processing so as to update the bias error in real time (S5). Therefore, the bias correction can be performed not only by correcting the bias error immediately after startup but also by updating the bias even during the subsequent continuation of the operation. Therefore, with the positioning device 100, the bias error included in the detection signal of the IMU 3 can be accurately removed. The positioning device 100 can accurately measure the position of the moving body 1 using the detection result of the IMU 3.

According to the above stationary determination processing S2, it is considered that the output value (S4) of the detection signal of the IMU 3 obtained if it is determined that the moving body 1 is stationary (Yes in S3) corresponds to the bias error without being caused by the angular velocity of the moving body 1. Therefore, by detecting such timing, the bias error can be updated (S5) with high accuracy. Hereinafter, details of the stationary determination processing S2 according to the present embodiment will be described.

2-2-3. Stationary Determination Processing

Figure 5:
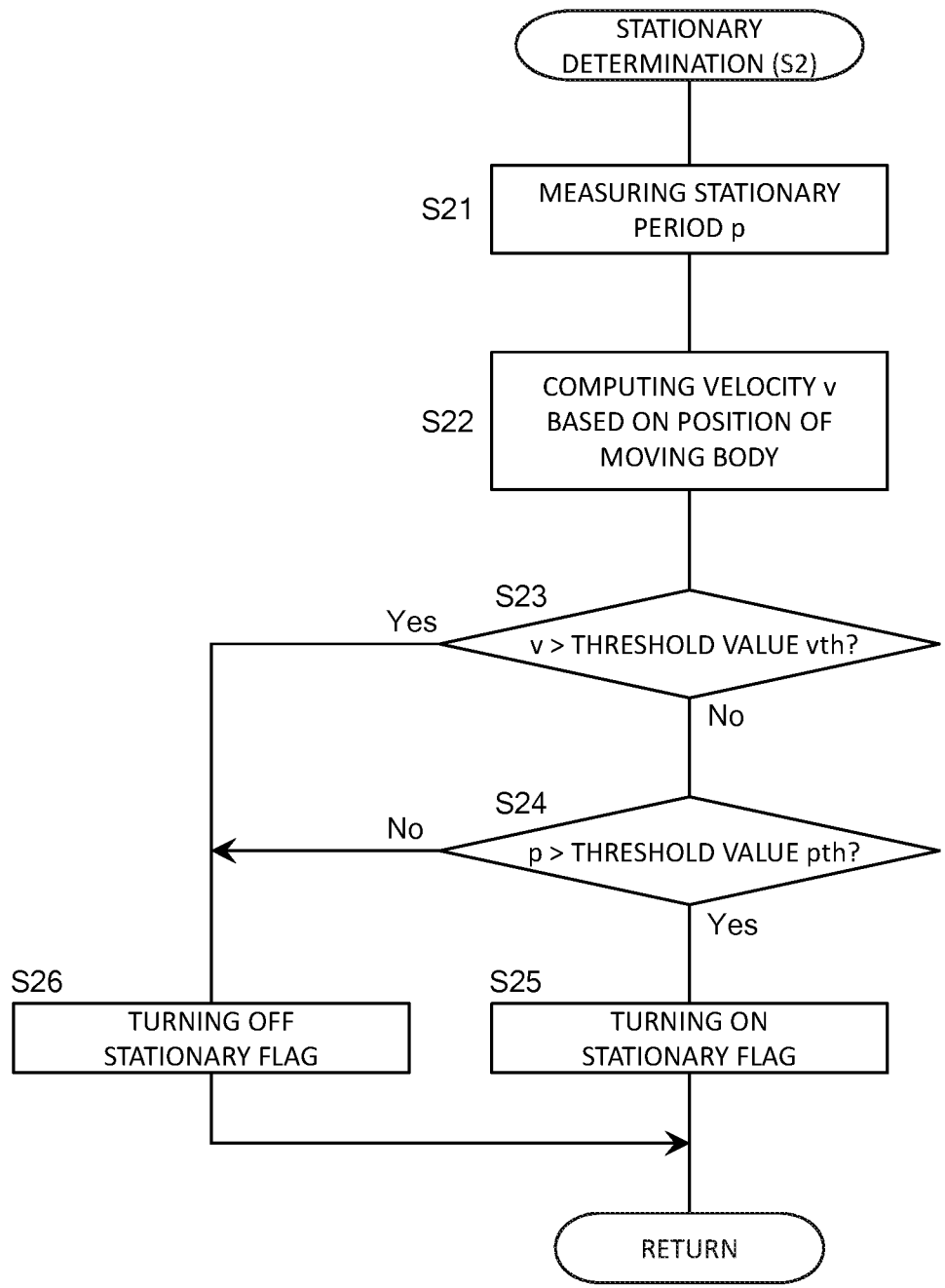
FIG. 5 is a flowchart showing an example of the stationary determination processing shown in FIG. 4.

FIG. 5 is a flowchart showing an example of the stationary determination processing S2 shown in FIG. 4. First, the controller 4 operating as the stationary determination unit 416 measures stationary period p (S21). At the start of measurement of the stationary period p, the stationary determination unit 416 starts counting up after resetting the stationary period p. In the example shown in FIG. 5, the stationary period p is a period in which the velocity v of the moving body 1 is equal to or less than a preset predetermined threshold value vth. For example, the threshold value vth is 0.075 (mis).

For example, next to step S21, the stationary determination unit 416 computes the velocity v of the moving body 1 based on the position data of the moving body 1 output from the position computation unit 414 (S22). For example, the stationary determination unit 416 acquires the position data on the moving body 1 output from the position computation unit 414 at fixed time intervals, and computes the velocity v as the magnitude of the change amount per unit time of the position of the moving body 1.

Next, the stationary determination unit 416 determines whether or not the computed velocity v of the moving body 1 is larger than the threshold value vth (S23). The threshold value vth is set in advance so as to indicate, for example, a reference velocity at which the moving body 1 can be regarded as moving. If the computed velocity v of the moving body 1 is larger than the threshold value vth (Yes in S23), the stationary determination unit 416 turns off the stationary flag (S26) and terminates the stationary determination processing S2. In this case, it is considered that the moving body 1 moves without being stationary, and since the process proceeds to NO in step S3 in FIG. 4, the bias error is not updated (S5). In this case, the stationary period p is reset, for example, in step S21 in the next loop.

If the computed velocity v of the moving body 1 is equal to or less than the threshold value vth (No in S23), the stationary determination unit 416 determines whether the stationary period p is longer than, for example, a predetermined threshold value pth (S24). The threshold value pth is set in advance so as to indicate, for example, a reference period during which the moving body 1 is considered to be stably stationary. It should be noted that the measurement of the stationary period p (S21) may be performed when the process proceeds to No in step S23.

If determining that the stationary period p during measurement is equal to or less than the threshold value pth (No in S24), the stationary determination unit 416 turns off the stationary flag (S26) and terminates the stationary determination processing S2, for example. In this case, unlike the case where the process proceeds to No in step S23, the stationary period p is not reset. On the other hand, if determining that the stationary period p is longer than the threshold value pth (Yes in S24), the stationary determination unit 416 turns on the stationary flag (S25) and terminates the stationary determination processing S2. In this case, it is considered that the moving body 1 is stably stationary. Therefore, the process proceeds to YES in step S3 in FIG. 4, and the bias error is updated using, for example, the detection signal of the IMU 3 in the stationary period p (S4, S5). For example, the threshold value pth is 5 (s).

As described above, the stationary determination unit 416 computes the velocity v of the moving body 1 based on the measurement result of the position computation unit 414 (S22), and determines that the moving body 1 is stationary (S25) if the state in which the velocity v is equal to or less than the threshold value vth is continued for the set period of the threshold value pth (Yes in S24). The velocity v is computed as, for example, a change amount per unit time of the measurement result of the position computation unit 414.

3. Effects and the Like

As described above, the positioning device 100 according to the present embodiment measures the position of the moving body 1. The positioning device 100 includes a camera 2, an IMU 3, a bias correction unit 421, a position computation unit 414, and a stationary determination unit 416. The camera 2 is mounted on the moving body 1, and captures an image of an environment around the moving body 1 to acquire a captured image. The IMU 3 is mounted on the moving body 1, detects motion of the moving body 1, and outputs a detection signal indicating a detection result. The bias correction unit 421 processes the detection signal using a correction value for correcting a bias error included in the detection signal of the IMU 3 without depending on the motion of the moving body 1. The position computation unit 414 computes the position of the moving body 1 based on the captured image acquired by the camera 2 and the detection signal processed by the bias correction unit. The stationary determination unit 416 determines whether or not the moving body 1 is stationary (S2). If the stationary determination unit 416 determines that the moving body is stationary (Yes in S3), the bias correction unit 421 updates the correction value of the bias error based on the detection signal output by the IMU 3 (S5).

Thus, the positioning device 100 can not only correct the bias error immediately after startup, but also update the correction value of the bias error to accurately correct the bias error even during the subsequent continuation of the operation. Therefore, the positioning device 100 can accurately measure the position of the moving body 1 using the detection result of the IMU 3.

Furthermore, in the positioning device 100, unlike the conventional technique, it is not necessary to install an external apparatus such as an anchor in a movement path of a moving body 1 in order to execute bias update processing. Therefore, according to the positioning device 100, the installation cost of an external apparatus such as an anchor can be reduced. In addition, since the positioning device 100 is not needed to be provided with a device for wireless communication with an external apparatus such as an anchor, it is possible to prevent the configuration from becoming complicated. As described above, the positioning device 100 can correct the bias error more easily than the conventional technique.

The positioning device 100 may further include a feature point extraction unit 411 that extracts a feature point from the captured image acquired by the camera 2. The position computation unit 414 may compute the position of the moving body 1 by tracking the feature points extracted by the feature point extraction unit 411 among a plurality of captured images sequentially acquired by the camera 2.

Tracking the features in this manner allows the positioning device 100 to measure the position of the moving body 1 with higher accuracy.

The stationary determination unit 416 computes the velocity v of the moving body 1 based on the computation result of the position computation unit 414, and determines that the moving body 1 is stationary (S25) if a state in which the velocity v is equal to or less than a preset threshold value vth (No in S23) continues for a predetermined period pth (Yes in S24).

Thus, it is possible to prevent determination that the moving body 1 is stationary when the moving body 1 stops for only a moment and resumes the movement immediately after the stop, and to determine that the moving body 1 is stationary when the moving body 1 actually stops. Therefore, it is possible to prevent the bias error from being computed assuming that the moving body 1 is stationary when the moving body 1 is not stationary, and it is possible to secure the accuracy of computing the bias error.

Second Embodiment

Hereinafter, a second embodiment will be described with reference to FIGS. 6 to 8. In the second embodiment, a positioning device that relaxes the determination criterion in the stationary determination processing S2 when the period in which the bias update is not performed becomes too long will be described.

Figure 6:
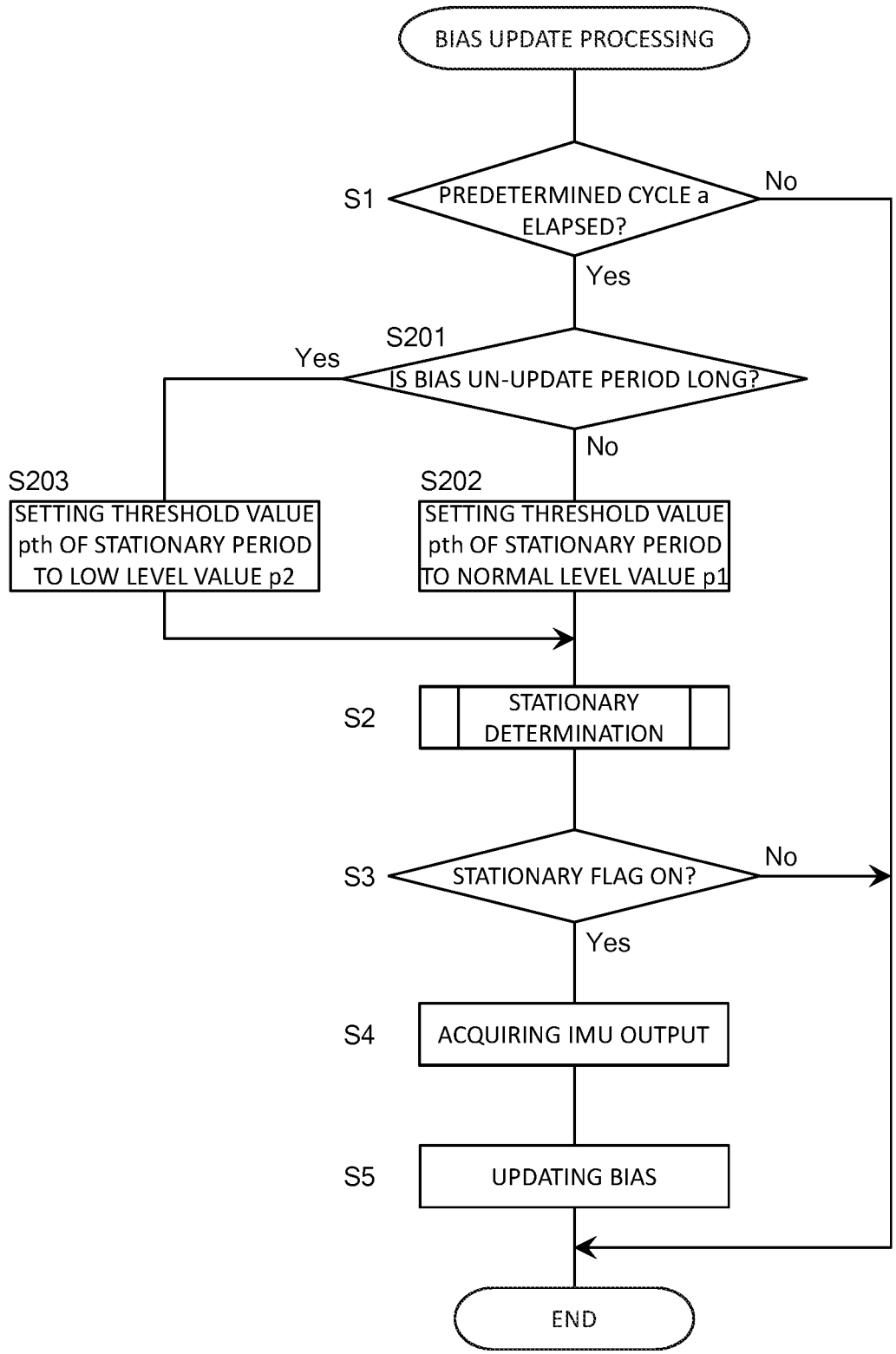
FIG. 6 is a flowchart showing an example of bias update processing executed by a positioning device according to a second embodiment.

FIG. 6 is a flowchart showing an example of bias update processing executed by the positioning device according to the second embodiment of the present disclosure. The bias update processing in FIG. 6 further includes steps S201 to S203 in addition to the bias update processing executed by the positioning device 100 according to the first embodiment shown in FIG. 4.

As shown in FIG. 6, if determining in step S1 that the predetermined cycle a has elapsed (Yes in S1), the controller 4 determines whether the bias un-update period is longer than the predetermined period, for example (S201). The bias un-update period is a time elapsed since the bias error was updated last. The predetermined period in step S201 is a reference period in which the bias un-update period is regarded to be too long, and is set to, for example, a plurality of times the predetermined cycle a.

If determining that the bias un-update period is not long (No in S201), the controller 4 sets the threshold value pth (see step S24 in FIG. 5) of the stationary period to a normal level value p1 (S202). The normal level value p1 is, for example, an initial value set similarly to the value of the threshold value pth of the first embodiment. Thereafter, stationary determination processing 32 is performed as in the first embodiment. On the other hand, if determining that the bias un-update period is long (Yes in S201), the controller 4 sets the threshold value pth of the stationary period to a low level value p2 smaller than the normal level value p1 (3203), and proceeds to the stationary determination processing S2. Since the subsequent steps are similar to those of the first embodiment, the description thereof will be omitted.

Figure 7:
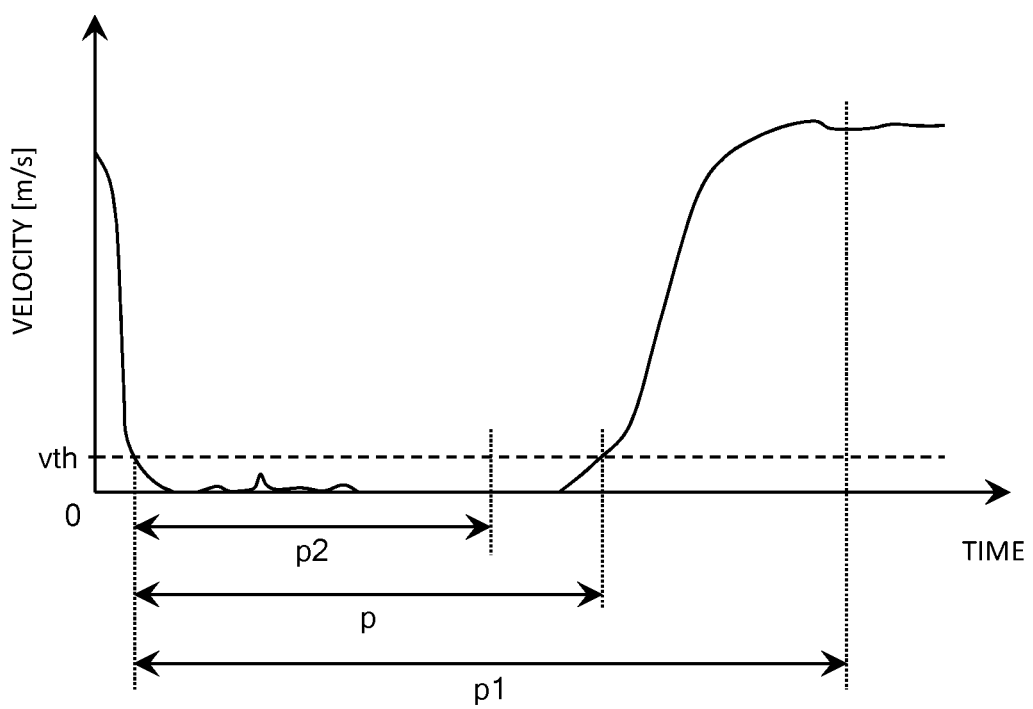
FIG. 7 is a graph for illustrating the operation of the positioning device according to the second embodiment.

FIG. 7 is a graph for illustrating the operation of the positioning device according to the present embodiment. The horizontal axis of the graph in FIG. 7 represents time. The vertical axis of the graph in FIG. 7 represents the velocity v of the moving body 1 computed in step S22 by the stationary determination unit 416.

As described with reference to FIG. 5 in the first embodiment, when the stationary period p in which the velocity v of the moving body 1 is equal to or less than the threshold value vth is longer than the threshold value pth, the stationary determination unit 416 turns on the stationary flag (S23 to S25). Assuming that the threshold value pth of the stationary period is the normal level value p1, in the moving body 1 that moves as shown in the graph in FIG. 7, since the stationary period p is shorter than the normal level value p1, the stationary flag is not turned on, and the bias update step S5 is not executed (see step S3 in FIG. 4). When the bias update step S5 is not executed for a long period of time, the bias error fluctuates, and the error included in the detection signal output from the IMU 3 increases.

Thus, in the present embodiment, if determining that the bias un-update period is long (Yes in S201), the controller 4 executes step S203 of setting the threshold value pth of the stationary period to the low level value p2 as described above. With this configuration, when the bias un-update period is too long, priority can be given to executing bias update step 35 as early as possible. Thus, with respect to the moving body 1 that moves as shown in the graph in FIG. 7, since the stationary period p is longer than the period indicated by the low level value p2, the stationary flag is turned on (see steps S24 and S25 in FIG. 5), and the bias update step S5 is executed (see steps S3 to S5 in FIG. 4).

It should be noted that in the above example, the threshold value pth of the stationary period can take only two values of the normal level value p1 and the low level value p2. However, the bias update processing in the present embodiment is not limited thereto, and the controller 4 has only to be one that decreases the threshold value pth of the stationary period as the time elapsed from the last update of the bias error is longer. For example, the threshold value pth of the stationary period may be set to three or more different values according to the bias un-update period. Alternatively, the threshold value pth of the stationary period may be set to take a continuous value according to the bias un-update period.

Figure 8:
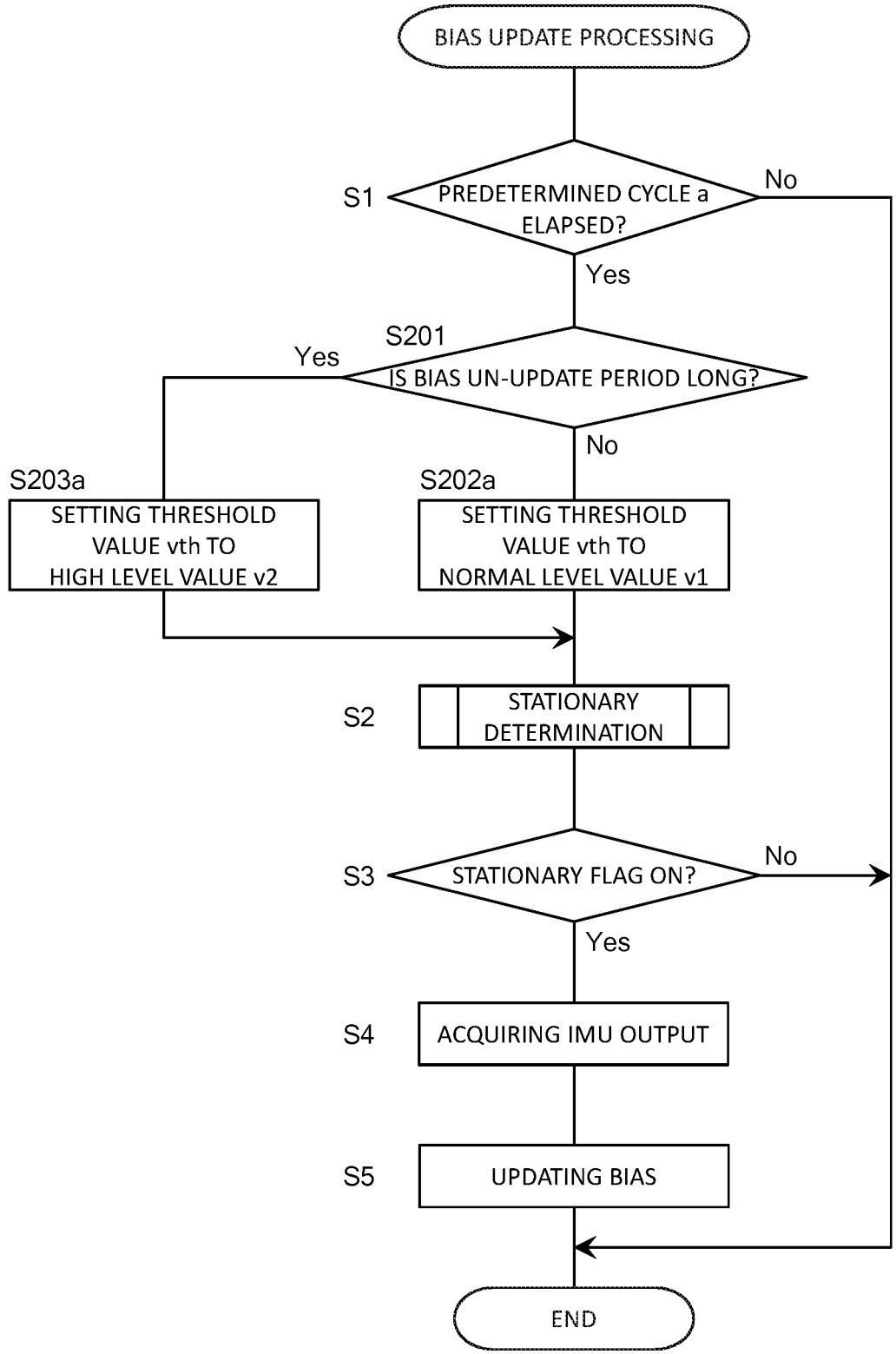
FIG. 8 is a flowchart showing a modified example of bias update processing executed by the positioning device according to the second embodiment.

FIG. 8 is a flowchart showing a modified example of bias update processing executed by the positioning device according to the second embodiment of the present disclosure. As compared with the bias update processing in FIG. 6, the bias update processing in FIG. 8 includes step S202a instead of step S202, and includes step S203a instead of step S203. In step S202a, the controller 4 sets the threshold value vth to a normal level value v1. The normal level value v1 is, for example, an initial value set similarly to the value of the threshold value vth of the first embodiment. In step S203a, the controller 4 sets the threshold value vth to a high level value v2 higher than the normal level value v1.

The bias update processing in the present embodiment is not limited thereto. For example, similarly to the above example of changing the threshold value pth of the stationary period, the controller 4 has only to be one that increases the threshold value vth as the time elapsed since the bias error was updated last is longer, and the threshold value vth may take three or more different values or continuous values.

In addition, the bias update processing illustrated in FIG. 6 and the bias update processing illustrated in FIG. 8 may be performed alone or in combination. For example, if determining that the bias un-update period is long (Yes in S201), the controller 4 may set the threshold value pth of the stationary period to the low level value p2 and set the threshold value vth to the high level value v2. In this case, if not determining that the bias un-update period is long (No in S201), the controller 4 may set the threshold value pth of the stationary period to the normal level value p1 and set the threshold value vth to the normal level value v1.

As described above, in the present embodiment, the stationary determination unit 416 sets the threshold value pth of the stationary period to be shorter (S203) and/or sets the threshold value vth to be larger (S203a) as the time elapsed from the last update of the bias error is longer, and determines whether or not the moving body is stationary (S2).

Thus, at least one of the threshold value pth and the threshold value vth of the stationary period is changed so that the bias update is executed as early as possible when a long period has elapsed without execution of the bias update. Therefore, a situation in which the bias update is not executed even though the bias error fluctuates can be eliminated at an early stage.

Third Embodiment

Hereinafter, a third embodiment will be described with reference to FIGS. 9 to 10. In the third embodiment, a positioning device using a temperature sensor will be described.

Figure 9:
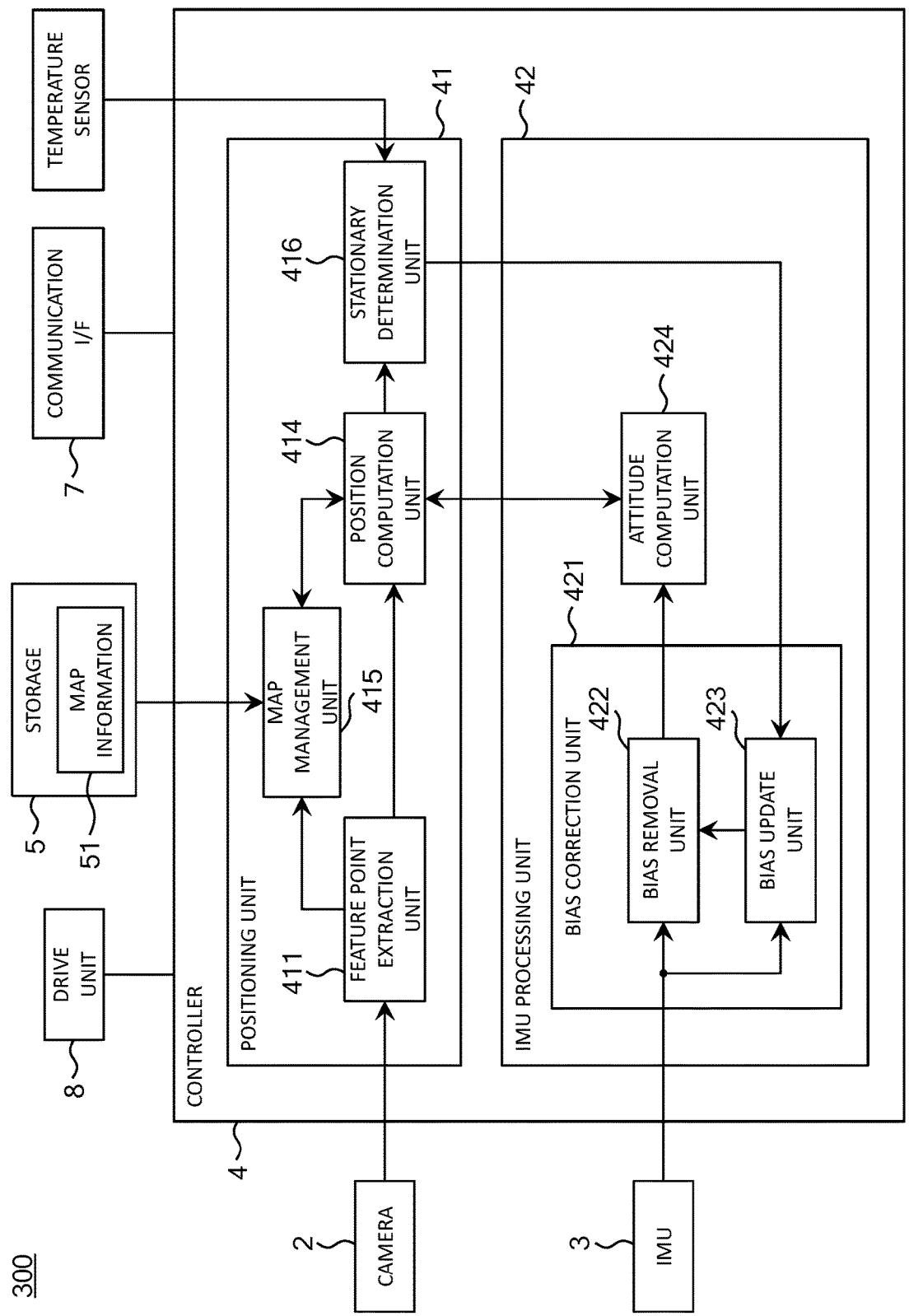
FIG. 9 is a block diagram showing a configuration of a positioning device according to a third embodiment.

FIG. 9 is a block diagram showing a configuration of a positioning device 300 according to the third embodiment of the present disclosure. As compared with the positioning device 100 according to the first embodiment shown in FIG. 2, the positioning device 300 in FIG. 9 further includes a temperature sensor 9.

The temperature sensor 9 detects the temperature of the environment around the moving body 1. The temperature sensor 9 may be one that detects the temperature of the IMU 3. The temperature sensor 9 may be mounted on the moving body 1 and may be directly or indirectly connected to the controller 4. Alternatively, the temperature sensor 9 may be installed in an environment around the moving body 1 without being mounted on the moving body 1. In this case, the temperature detected by the temperature sensor 9 is transmitted to the controller 4 by wired or wireless communication. For example, the temperature detected by the temperature sensor 9 may be transmitted to the controller 4 via the network and the communication I/F 7 of the positioning device 300.

Figure 10:
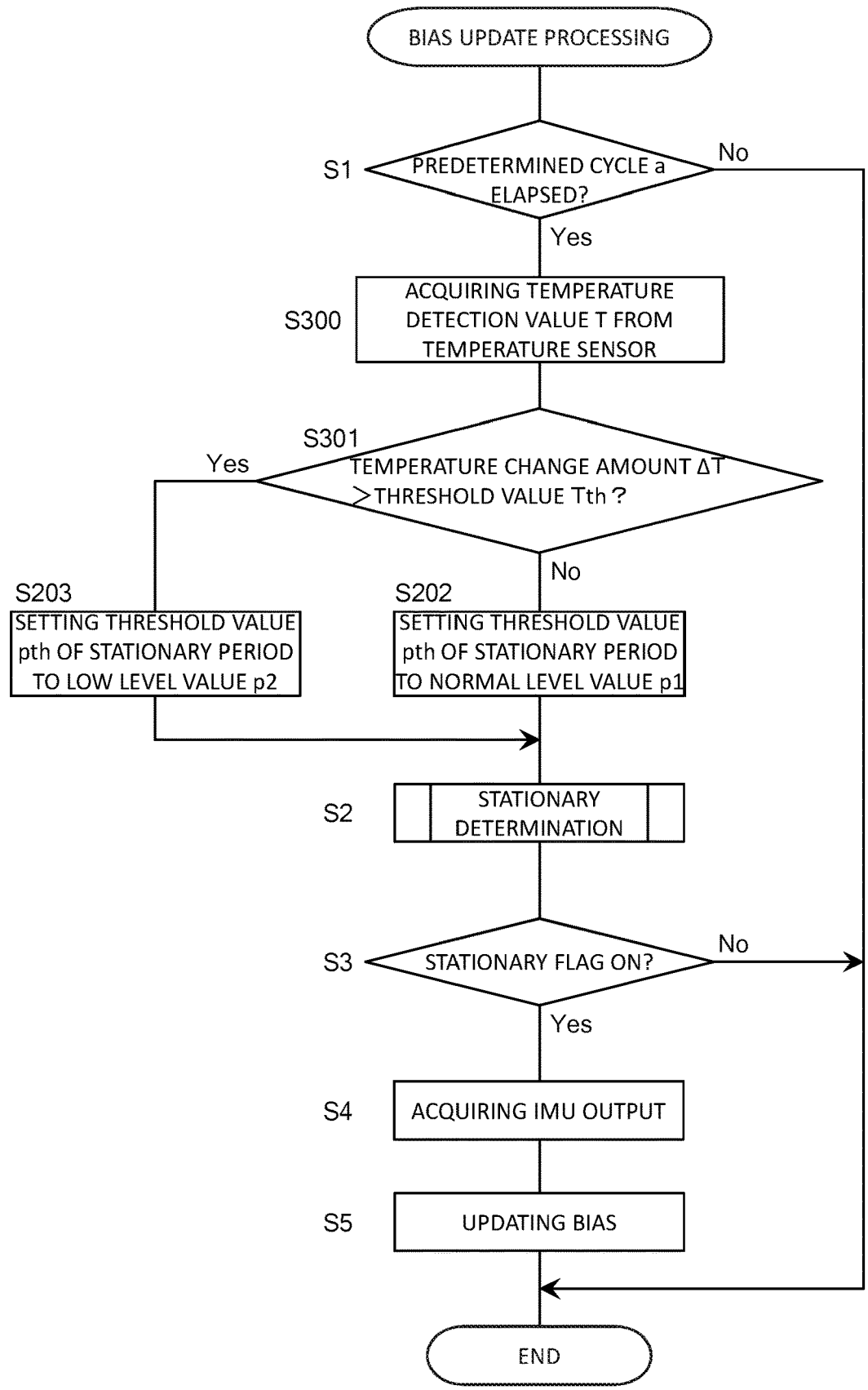
FIG. 10 is a flowchart showing an example of bias update processing executed by the positioning device according to the third embodiment.

FIG. 10 is a flowchart illustrating an example of bias update processing executed by the positioning device 300. As compared with the bias update processing in FIG. 6, the bias update processing in FIG. 10 further includes step S300 of acquiring the temperature detection value T being the detection result from the temperature sensor 9, for example, next to step S1. Step S300 may be executed if it is determined in step S1 that the predetermined cycle a has elapsed (Yes in S1), or may be executed if it is determined that the predetermined cycle a has not elapsed (No in S1). In addition, as compared with the bias update processing in FIG. 6, the bias update processing in FIG. 10 includes step 3301 instead of step S201 of determining whether or not the bias un-update period is long.

In step S301, the controller 4 determines whether or not a temperature change amount ΔT being a change amount of the temperature detection value T is larger than a predetermined threshold value Tth using the temperature detection value T acquired from the temperature sensor 9. The temperature change amount ΔT is defined as, for example, an amount by which the temperature detection value T changes per unit time. If determining that the temperature change amount ΔT is equal to or less than the predetermined threshold value Tth (No in S301), the controller 4 sets the threshold value pth of the stationary period to the normal level value p1 (S202). Thereafter, stationary determination processing S2 is performed as in the first embodiment and the second embodiment. If determining that the temperature change amount ΔT is larger than the predetermined threshold value Tth (Yes in S3011, the controller 4 sets the threshold value pth of the stationary period to a low level value p2 smaller than the normal level value p1 (S203), and proceeds to step S2. Since the subsequent steps are similar to those of the first embodiment and the second embodiment, the description thereof will be omitted.

In the present embodiment, the bias update processing executed by the positioning device 300 may include step S202a of setting the threshold value vth to the normal level value v1 and step S203a (see FIG. 8) of setting the threshold value vth to a high level value v2 higher than the normal level value v1 instead of or in addition to steps S202 and S203.

The temperature change amount ΔT is computed by the stationary determination unit 416, for example. However, the present embodiment is not limited thereto, and the temperature change amount ΔT may be computed by any functional block of the controller 4.

As described above, the positioning device 300 further includes a temperature sensor 9 that detects the temperature of the environment around the moving body 1. The stationary determination unit 416 sets the threshold value pth of the stationary period to be shorter and/or sets the threshold value vth to be larger as the change in temperature detected by the temperature sensor 9 is larger, and determines whether or not the moving body 1 is stationary.

One of the causes of the fact that the bias error fluctuates from the bias error immediately after startup is a temperature change in the surrounding environment. When the change in temperature detected by the temperature sensor 9 is large, there is a high possibility that the bias error fluctuates. Thus, when the change in the temperature detected by the temperature sensor 9 is large, the positioning device 300 according to the present embodiment changes at least one of the threshold value pth and the threshold value vth of the stationary period so that the bias update is executed as early as possible. Therefore, a situation in which the bias update is not executed even though the bias error fluctuates can be eliminated at an early stage.

Fourth Embodiment

Hereinafter, a fourth embodiment will be described with reference to FIG. 11. In the second embodiment, the determination criterion of the stationary determination processing S2 is relaxed when the bias un-update period becomes too long. In the present embodiment, instead of the determination criterion of the stationary determination processing S2, a positioning device that shortens the cycle a of the bias update processing will be described.

Figure 11:
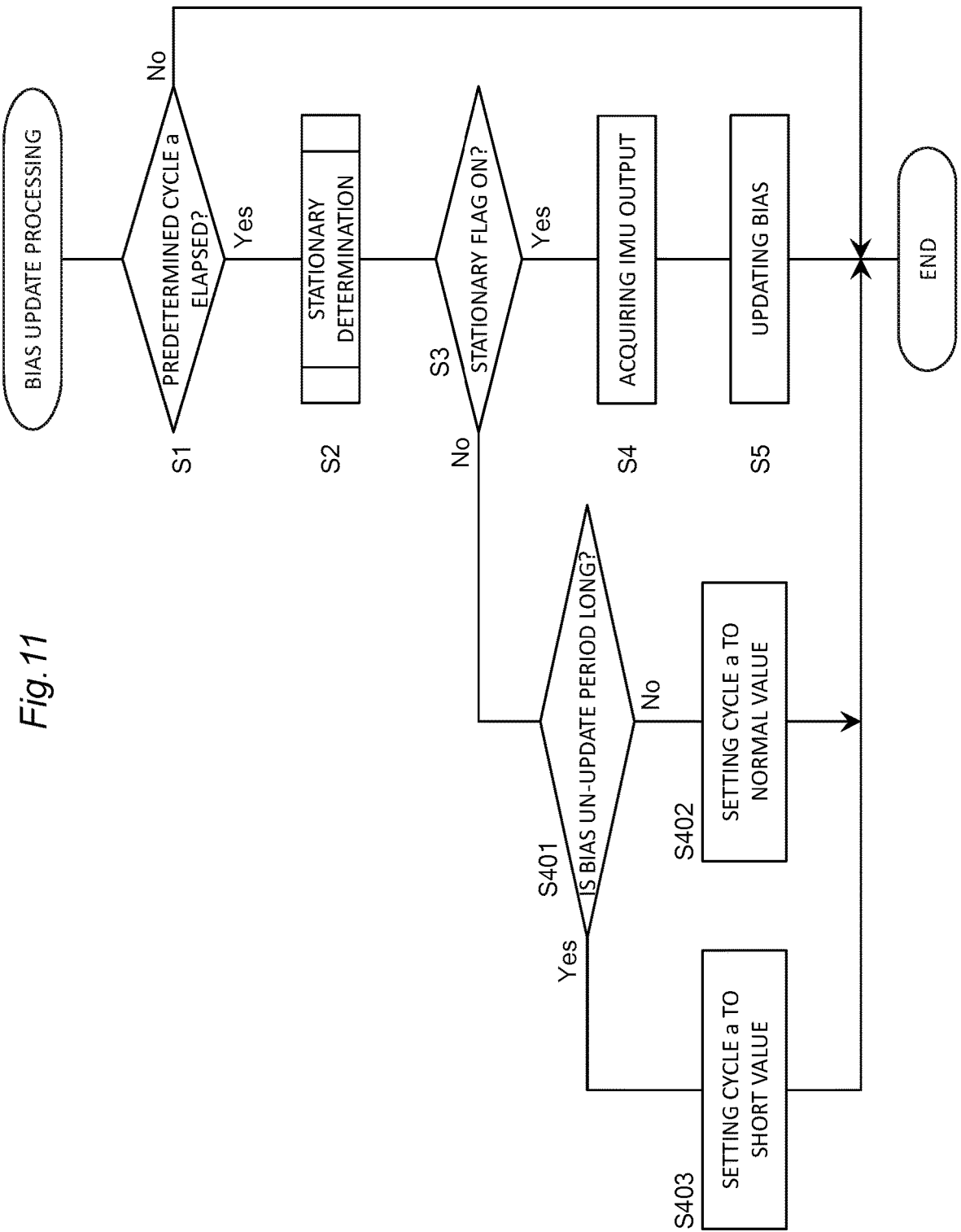
FIG. 11 is a flowchart showing an example of bias update processing executed by a positioning device according to a fourth embodiment.

FIG. 11 is a flowchart showing an example of bias update processing executed by the positioning device according to the fourth embodiment of the present disclosure. The bias update processing in FIG. 11 further includes steps S401 to S403 in addition to the bias update processing executed by the positioning device 100 according to the first embodiment shown in FIG. 4.

Unlike FIG. 4, in FIG. 11, if determining in step S3 that the stationary flag is OFF (No in S3), the controller 4 determines whether the bias un-update period is long, for example, as in step S201 of the second embodiment (S401).

If determining that the bias un-update period is not long (No in S401), the controller 4 sets the cycle a to a normal value (S402). On the other hand, if determining that the bias un-update period is long (Yes in S401), the controller 4 sets the cycle a to a value shorter than the normal value (S403), and ends the processing in FIG. 11. The bias update processing in FIG. 11 is repeatedly executed by the controller 4. Therefore, in step S1 in the next loop in which the cycle a is set to a short value in step S402, the controller 4 determines whether the reset and shortened cycle a has elapsed since the bias update processing was completed last.

Thus, for example, if the cycle a is 5 minutes in the initial setting and the stationary determination step S2 is executed once every 5 minutes but the bias is not updated for a long period of time (Yes in S401), the cycle a is reset to 1 minute to be shortened (S402), and thereafter, the stationary determination step S2 is executed at a pace of once per 1 minute.

As described above, the stationary determination unit 416 determines whether or not the moving body 1 is stationary for each preset cycle a. The cycle a is set to be shorter as the time elapsed from the last update of the bias error is longer (S402).

Even in a state where it is determined to be stationary if the stationary determination is made, the stationary determination is not made and the stationary flag is not turned on as long as the cycle a has not elapsed since the last stationary determination. In the present embodiment, when the time elapsed since the bias error is last updated is long, the frequency of performing the stationary determination is increased by shortening the cycle a. Therefore, the opportunity of being determined to be stationary can be increased, and a situation in which the bias update is not executed even though the bias error fluctuates can be eliminated at an early stage.

Fifth Embodiment

Hereinafter, a fifth embodiment will be described with reference to FIGS. 12 to 13. In the present embodiment, a positioning device using a variation of a detection signal of the IMU 3 for determining the presence or absence of bias update will be described.

Figure 12:
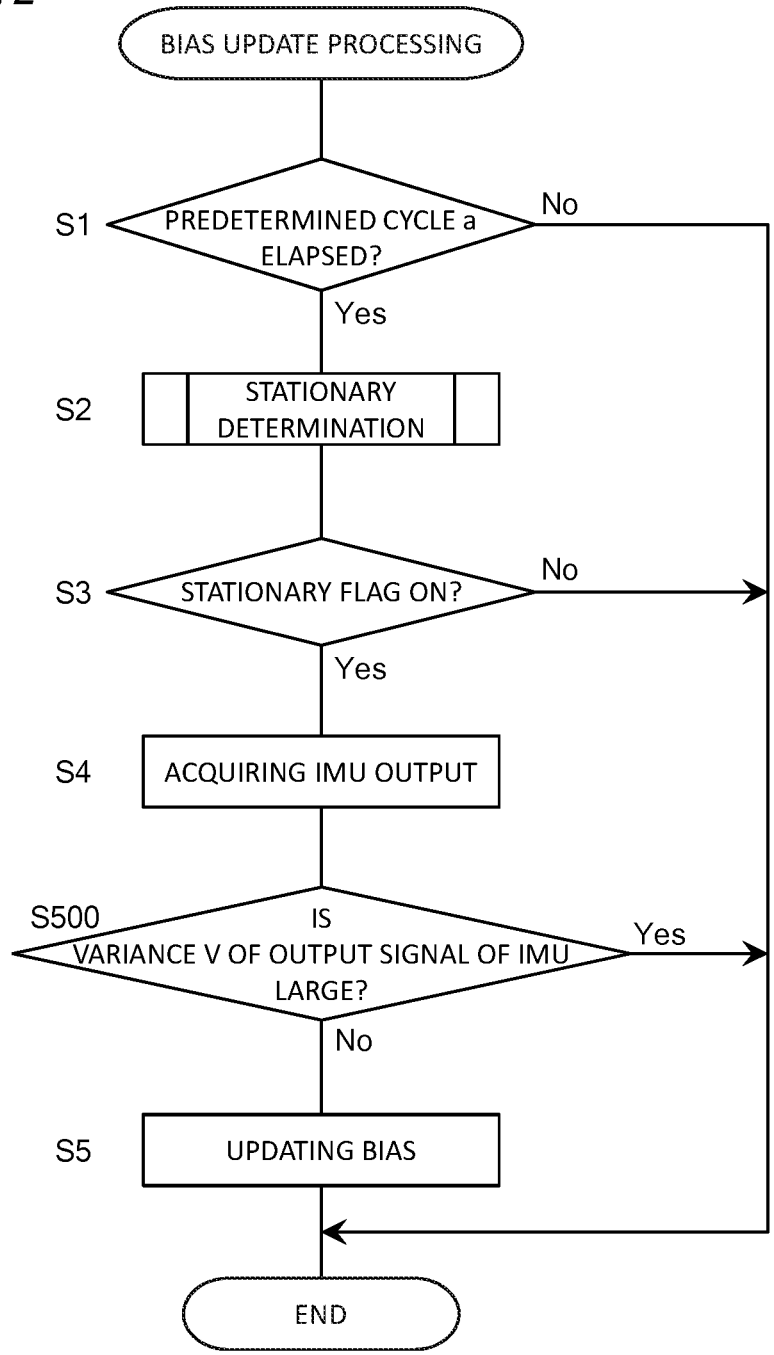
FIG. 12 is a flowchart showing an example of bias update processing executed by a positioning device according to a fifth embodiment.

FIG. 12 is a flowchart showing an example of bias update processing executed by the positioning device according to the width embodiment of the present disclosure. The bias update processing in FIG. 12 further includes step S500 in addition to the bias update processing executed by the positioning device 100 according to the first embodiment shown in FIG. 4.

Step S500 is executed between step S4 and step S5 by, for example, the controller 4 operating as the bias update unit 423 of the bias correction unit 421. In step S500, the controller 4 determines whether the variance V of the output signal of the IMU 3 is larger than, for example, a predetermined threshold value Vth. If determining that the variance V is larger (Yes in S500), the controller 4 operating as the bias update unit 423 ends the processing without executing the bias update step S5. If not determining that the variance V is larger (No in S500), the controller 4 operating as the bias update unit 423 executes the bias update step S5.

Figure 13A:
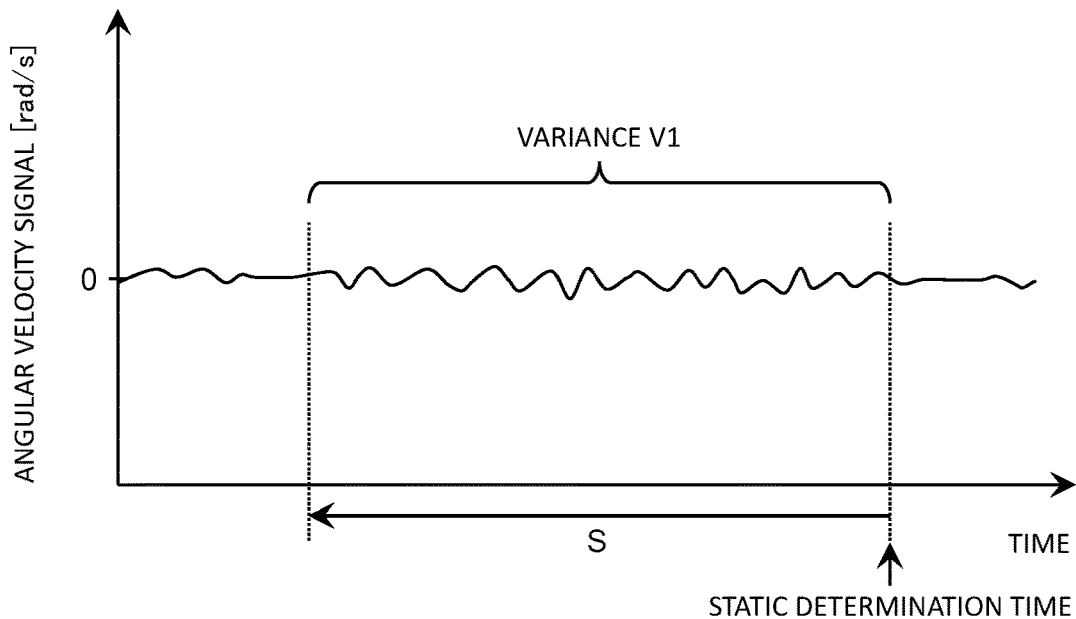
FIG. 13A is a graph showing a temporal change in an angular velocity signal being an example of an output signal of an IMU of the positioning device according to the fifth embodiment.
Figure 13B:
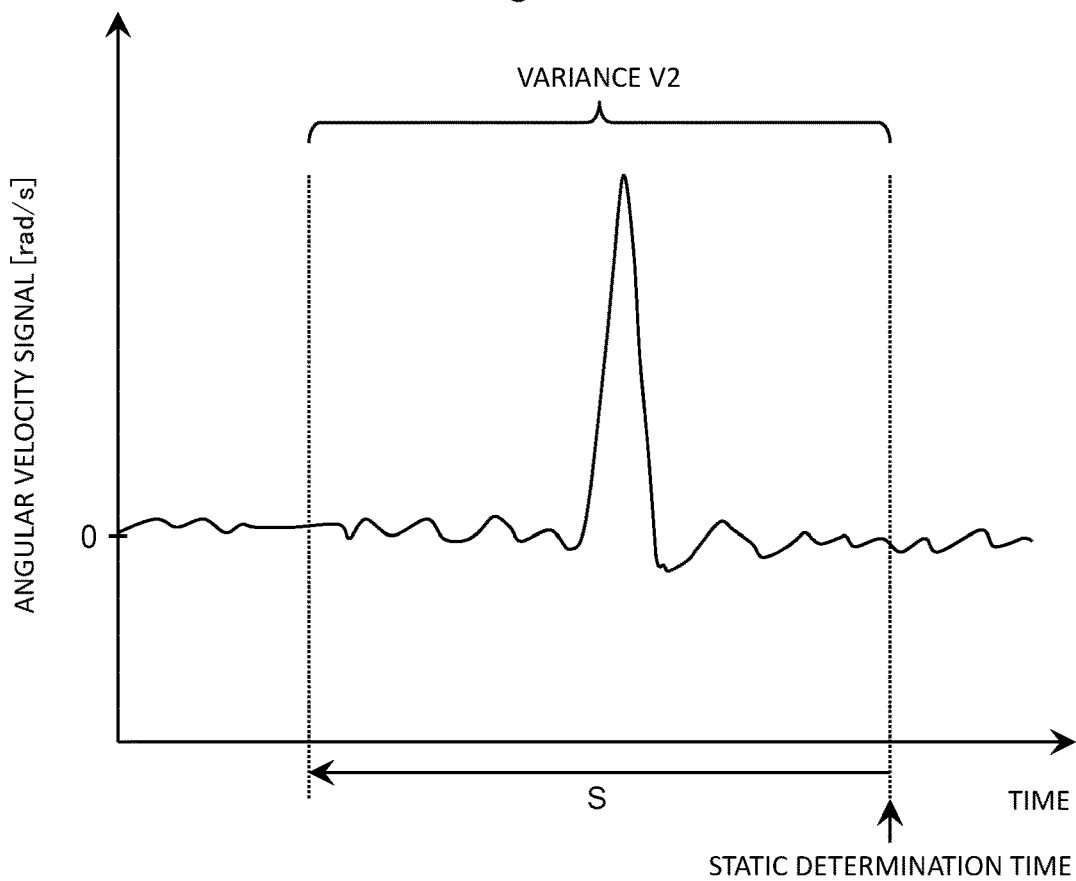
FIG. 13B is a graph showing a temporal change in an angular velocity signal being an example of an output signal of an IMU of the positioning device according to the fifth embodiment.

FIGS. 13A and 13B is a graph showing a temporal change in an angular velocity signal being an example of an output signal of the IMU 3. In the flow in FIG. 12, if determining in step 33 that the stationary flag is ON, the controller 4 operating as the bias update unit 423 acquires the detection signal output by the IMU 3 (S4). Next, the controller 4 acquires the detection signals output from the IMU 3 between the time point going back by a predetermined time S from the stationary determination time when the stationary flag is turned on and the stationary determination time, and computes the variance V of the detection signal values. In step S500, the controller 4 determines, for example, whether the computed variance V is larger than the predetermined threshold value Vth.

FIG. 13A shows that the variance of the angular velocity signals output from the IMU 3 between the static determination time and a time point going back by a predetermined time S from the static determination time is V1, and FIG. 13B shows that the variance is V2. Here, it is assumed that V1<Vth, and V2>Vth. When the variance V1 is smaller than the predetermined threshold value Vth as shown in FIG. 13A, the process proceeds to No in step S500, and the controller 4 operating as the bias update unit 423 executes the bias update step S5. On the other hand, when the variance V2 is larger than the predetermined threshold value Vth as shown in FIG. 13B, the process proceeds to Yes in step S500, and the controller 4 operating as the bias update unit 423 does not execute the bias update step S5.

As described above, the bias correction unit 421 determines whether or not to update the bias error based on the variance V of the values of the detection signals output by the IMU 3 (S500). For example, when the variance V of the values of the detection signals output by the IMU 3 is larger than the predetermined threshold value Vth, the bias correction unit 421 determines not to update the bias error.

Thus, since the variance V is small and it is possible to compute the bias error using the reliable value of the detection signal of the IMU 3 to perform the bias update, the bias error can be corrected more accurately.

Sixth Embodiment

Hereinafter, a sixth embodiment will be described with reference to FIG. 14. In the present embodiment, a positioning device that uses feature points in position computation to determine the presence or absence of bias update will be described.

Figure 14:
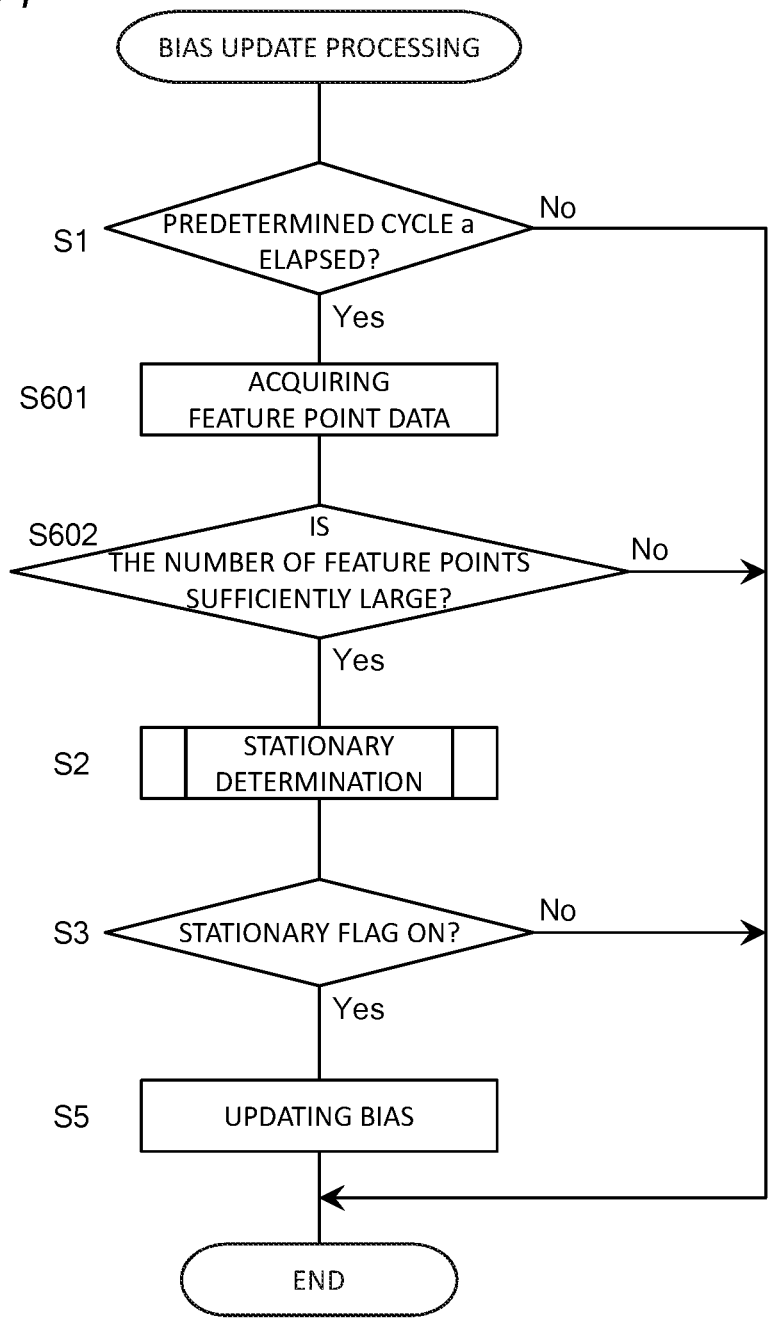
FIG. 14 is a flowchart showing an example of bias update processing executed by a positioning device according to a sixth embodiment.

FIG. 14 is a flowchart showing an example of bias update processing executed by the positioning device according to the sixth embodiment of the present disclosure. The bias update processing in FIG. 14 further includes steps S601 and S602 between step S1 and step S2 in addition to the bias update processing executed by the positioning device 100 according to the first embodiment shown in FIG. 4.

In step S601, for example, the stationary determination unit 416 acquires feature point data from the feature point extraction unit 411. The feature point data is, for example, data indicating coordinates of all feature points in the captured image. The stationary determination unit 416 computes the number of feature points present in the captured image based on the feature point data. Alternatively, the stationary determination unit 416 may acquire the number of feature points from the feature point extraction unit 411 as the feature point data.

In step S602 next to step S601, the stationary determination unit 416 determines whether the number of feature points in the captured image is sufficiently large. For example, if the number of feature points in the captured image is a predetermined threshold value or more, the stationary determination unit 416 determines that the number of feature points in the captured image is sufficiently large. If it is determined that the number of feature points is sufficiently large (Yes in S602), the process proceeds to stationary determination processing S2. If not determining that the number of feature points is sufficiently large (No in S602), the controller 4 ends the bias update processing in FIG. 14 and does not execute the bias update step S5. Since the subsequent steps are similar to those of the first embodiment, the description thereof will be omitted.

An example in which step S601 of acquiring the feature point data and step S602 of determining whether or not the number of feature points is sufficiently large are executed between step S1 and step S2 has been described, but the present embodiment is not limited thereto. For example, steps S601 and S602 may be executed immediately before the bias update step S5.

As described above, the positioning device may further include a feature point extraction unit 411 that extracts a feature point from the captured image acquired by the camera 2. If the number of feature points extracted by the feature point extraction unit is less than the predetermined number (No in S602), the bias correction unit 421 does not update the bias error.

When the number of feature points is not sufficiently large, the accuracy of computation of the position of the moving body 1 by the position computation unit 414, the accuracy of the stationary determination by the stationary determination unit 416 based on the computed position of the moving body 1, and the like are not high, and the reliability of these pieces of processing is not secured. In the present embodiment, when the reliability of the position computation processing, the stationary determination processing, and the like is not secured as described above, the bias update step S5 is not executed, and the bias error can be prevented from being updated to a value with lower reliability.

Other Embodiments

As described above, the first to sixth embodiments have been described as examples of the technique disclosed in the present application. However, the technique in the present disclosure is not limited to this, and can also be applied to embodiments in which changes, substitutions, additions, omissions, and the like are made as appropriate. In addition, it is also possible to combine each component described in the first to sixth embodiments to form a new embodiment.

Thus, in the following, other embodiments will be exemplified. In the stationary determination processing (S2) of the first embodiment shown in FIG. 5, step S22 of computing the velocity v of the moving body 1 based on the position of the moving body 1 has been described, and processing of determining whether to turn on or off the stationary flag based on whether or not the computed velocity v is larger than the threshold value vth has been described. The stationary determination unit 416 of the positioning device according to the present disclosure has only to be one that determines whether or not the moving body is stationary, and is not limited to one that computes the velocity v of the moving body 1 based on the position of the moving body 1. For example, the stationary determination unit 416 compares the position of the feature point in the previous frame with the position of the feature point in the current frame corresponding to the feature point in the previous frame to compute the movement amount of the feature point from the previous frame to the current frame, and determines that the moving body 1 is stationary when the average movement amount d being the average value of the movement amounts for each feature point is equal to or less than a predetermined threshold value dth. That is, when the difference between the images of the previous frame and the current frame is small, it is determined that the camera 2 and eventually the moving body 1 is stationary. Thus, since the stationary determination can be performed without computing the velocity v of the moving body 1, the processing load of the controller 4 can be reduced, and the stationary determination can be performed with high speed.

Figure 15:
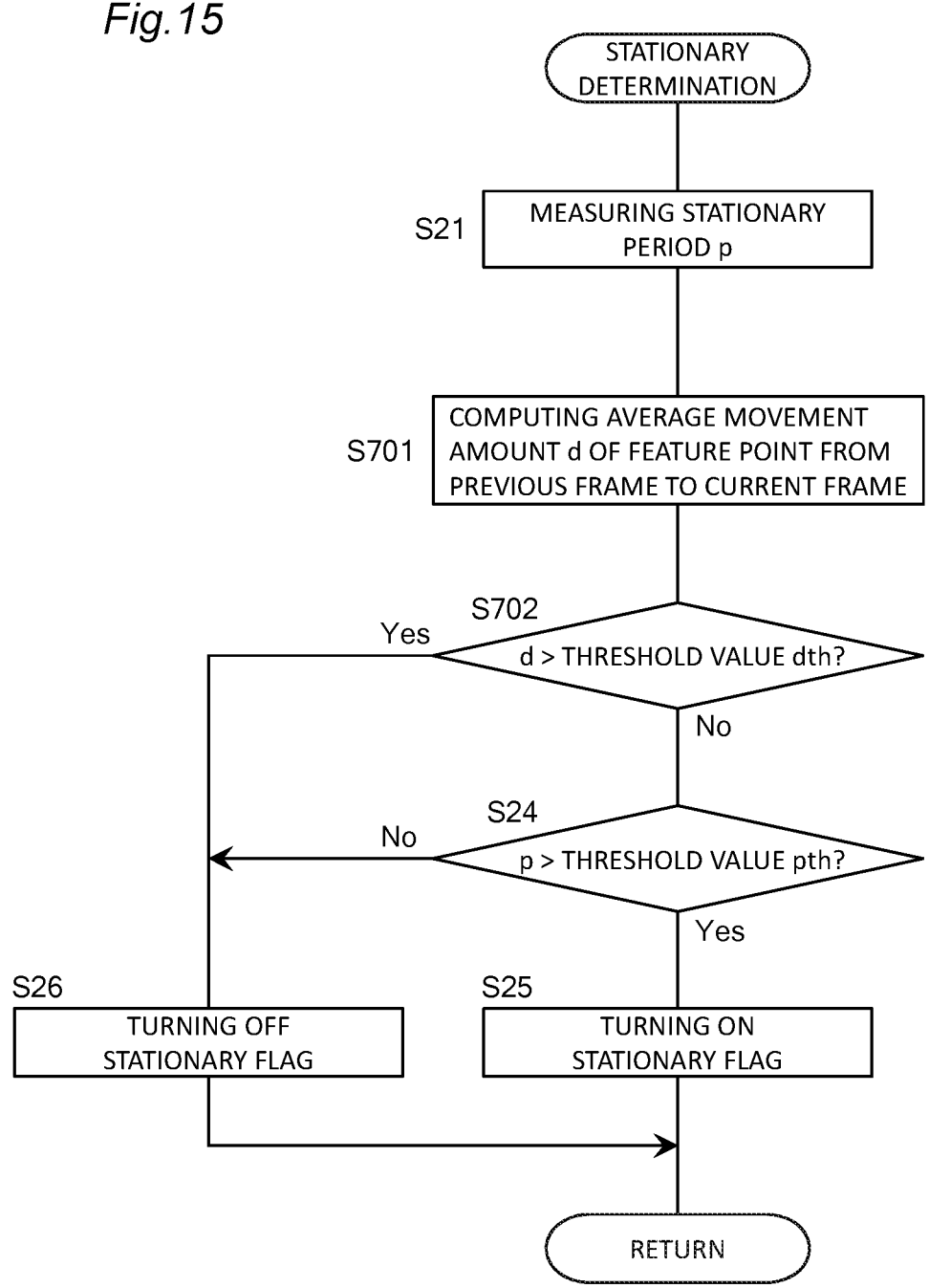
FIG. 15 is a flowchart illustrating stationary determination processing executed by a positioning device according to another embodiment.

FIG. 15 is a flowchart illustrating stationary determination processing executed by the positioning device according to such another embodiment. As compared with the stationary determination processing of the first embodiment shown in FIG. 5, the stationary determination processing in FIG. 15 includes step S701 instead of step S22, and includes step S702 instead of step S23.

In step S701, the stationary determination unit 416 computes the average movement amount d of the feature point from the previous frame to the current frame. Next, in step S702, the stationary determination unit 416 determines whether the average movement amount d is larger than a predetermined threshold value dth. If the average movement amount d is larger than the predetermined threshold value dth (Yes in S702), the stationary determination unit 416 turns off the stationary flag (S26i and terminates the stationary determination processing. If the average movement amount d is equal to or less than the predetermined threshold value dth (No in S702), the process proceeds to step S24. Since the subsequent steps are similar to those of the first embodiment, the description thereof will be omitted.

In the above embodiments, with respect to the IMU 3 being an example of the detector, an example has been described in which the IMU 3 detects the angular velocity of the moving body 1 and outputs a detection signal indicating the detection result. The IMU 3 has only to be one that detects motion information indicating the motion of the moving body 1, and may be, for example, an acceleration sensor. For example, the controller 4 operating as the bias update unit 423 acquires the detection signal (S4) output by the acceleration sensor if the stationary flag is ON (Yes in S3 in FIG. 4), and updates the bias error by setting the correction value of the bias error based on the signal value (S5). For example, the correction value of the bias error is computed assuming that gravitational acceleration of 1 g (m/s$^2$) is applied to the acceleration sensor downward in the vertical direction (−z direction). In this case, the controller 4 may compute the difference between the detection signal output by the acceleration sensor and the acceleration of 1 g (m/s$^2$) downward in the vertical direction, and may use the computation result as the correction value of the bias error. In addition, in this case, the controller 4 may compute the correction value of the bias error for the horizontal direction component on the assumption that the acceleration component in the horizontal direction (x direction and y direction) orthogonal to the vertical direction is zero.

In the above embodiments, an example in which the detection result of the IMU is used as an auxiliary means for improving the accuracy of the computation of the camera pose has been described. In the present embodiment, the method for using the detection result of the IMU is not limited thereto, and may be used, for example, to compute the camera pose only from the detection result of the IMU when a "lost" occurs. Here, the term "lost" means that the number of feature points successful in feature point matching is not, equal to or larger than a predetermined threshold value, or that the positioning device cannot compute a camera pose based on a geometric positional relationship between a feature point in the previous frame and a feature point in the current frame.

In the above embodiments, the application in which the positioning device 100 is applied to the application in which the position history data on the moving body 1 is accumulated has been described. In the present embodiment, the application of the positioning device 100 is not limited to the above, and may be applied to, for example, driving control of the moving body 1. In these applications, the accuracy of the driving control of the moving body 1 can be improved by updating the bias error in real time as in the above-described embodiments, for example.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

INDUSTRIAL APPLICABILITY

The present disclosure is applicable to a positioning device that measures a position of the moving body.

What is claimed is:

1. A positioning device that determines a position of a moving body, the positioning device comprising:
   a camera that is mounted on the moving body and captures an image of surroundings of the moving body to acquire a captured image;
   a sensor that is mounted on the moving body and detects motion of the moving body to output a detection signal indicating a detection result; and
   a circuit that processes the detection signal using a correction value for correcting a bias error included in the detection signal without depending on the motion of the moving body;
   wherein the circuit performs:
   computing the position of the moving body based on the captured image acquired by the camera and a detection signal processed; and
   determining whether or not the moving body is stationary;
   wherein the circuit:
   updates a correction value of the bias error based on a detection signal output by the sensor when the circuit determines that the moving body is stationary, and
   does not update a correction value of the bias error based on a detection signal output by the sensor when the circuit determines that the moving body is not stationary,
   wherein the circuit computes velocity of the moving body based on a computation result of the circuit, and determines that the moving body is stationary when a state in which the velocity is equal to or less than a preset threshold value is continued for a predetermined period, and
   wherein the circuit sets the predetermined period to be shorter and/or the threshold value to be larger as a time elapsed from last update of the bias error is longer to determine whether or not the moving body is stationary.

2. The positioning device according to claim 1, wherein the circuit extracts a feature point(s) from a captured image acquired by the camera, and
   computes a position of the moving body by tracking a feature point extracted by the circuit among a plurality of captured images sequentially acquired by the camera.

3. The positioning device according to claim 1, wherein the circuit
   extracts a feature point from a captured image acquired by the camera, and
   does not update the bias error when the number of feature points extracted by the circuit is less than a predetermined number.

4. A positioning device that determines a position of a moving body, the positioning device comprising:
   a camera that is mounted on the moving body and captures an image of surroundings of the moving body to acquire a captured image;
   a sensor that is mounted on the moving body and detects motion of the moving body to output a detection signal indicating a detection result; and
   a circuit that processes the detection signal using a correction value for correcting a bias error included in the detection signal without depending on the motion of the moving body; and
   a temperature sensor that detects a temperature of an environment around the moving body, and wherein the circuit performs:
   computing the position of the moving body based on the captured image acquired by the camera and a detection signal processed; and
   determining whether or not the moving body is stationary;
   wherein the circuit:
   updates a correction value of the bias error based on a detection signal output by the sensor when the circuit determines that the moving body is stationary, and
   does not update a correction value of the bias error based on a detection signal output by the sensor when the circuit determines that the moving body is not stationary,
   wherein the circuit computes velocity of the moving body based on a computation result of the circuit, and determines that the moving body is stationary when a state in which the velocity is equal to or less than a preset threshold value is continued for a predetermined period, and
   wherein the circuit sets the predetermined period to be shorter and/or the threshold value to be larger as a change in temperature detected by the temperature sensor is larger to determine whether or not the moving body is stationary.

5. A positioning device that determines a position of a moving body, the positioning device comprising:
   a camera that is mounted on the moving body and captures an image of surroundings of the moving body to acquire a captured image;
   a sensor that is mounted on the moving body and detects motion of the moving body to output a detection signal indicating a detection result;
   a circuit that processes the detection signal using a correction value for correcting a bias error included in the detection signal without depending on the motion of the moving body;

wherein the circuit performs:
computing the position of the moving body based on the captured image acquired by the camera and a detection signal processed;
determining whether or not the moving body is stationary; and
updating a correction value of the bias error based on a detection signal output by the sensor when the circuit determines that the moving body is stationary,
wherein the circuit does not update a correction value of the bias error based on a detection signal output by the sensor when the circuit determines that the moving body is not stationary,
wherein
the circuit determines whether or not the moving body is stationary for each preset cycle, and
the cycle is set to be shorter as a time elapsed from last update of the bias error is longer.

6. The positioning device according to claim 5, further comprising a temperature sensor that detects a temperature of an environment around the moving body, and
wherein the circuit sets the cycle to be shorter as a change in temperature detected by the temperature sensor is larger to determine whether or not the moving body is stationary.

7. The positioning device according to claim 1, wherein the circuit determines whether or not to update the bias error based on variance of values of the detection signals output by the sensor.

8. The positioning device according to claim 1, wherein the sensor includes a gyro sensor that detects an angular velocity as motion of the moving body.

* * * * *